Oct. 2, 1945.　　　　C. N. RAUP　　　　2,386,005

SELF LEVELING CASTER

Filed Aug. 15, 1944

INVENTOR.
Clyde N. Raup
BY
Victor J. Evans & Co.
ATTORNEYS

Patented Oct. 2, 1945

2,386,005

UNITED STATES PATENT OFFICE 2,386,005

SELF-LEVELING CASTER

Clyde N. Raup, Catawissa, Pa.

Application August 15, 1944, Serial No. 549,604

5 Claims. (Cl. 16—44)

This invention relates to a caster and it is one object of the invention to provide a caster of such construction that the caster will be self leveling and thus make it unnecessary to place paper or a wedge of other suitable material under a roller in order to raise a corner of an article of furniture and causes the same to rest level when resting upon an uneven floor or with one roller upon a rug.

Another object of the invention is to provide a caster having its roller carried by an axle which is eccentrically mounted between forks of a frame and raised or lowered by rotation of the axle.

Another object of the invention is to provide the axle with a spring which tends to impart rotation to the axle in one direction, rotation of the axle being limited by companion abutments carried by the axle and a form of the frame, and the spring being wound by rotation of the axle with the roller as an article is moved across a floor.

Another object of the invention is to provide a caster of this character which is simple in construction, and easy to assemble, the spring having one end anchored to a fork of the frame and its other end adjustably connected with the other fork so that tension of the spring may be controlled.

The invention is illustrated in the accompanying drawing wherein.

Figure 1:
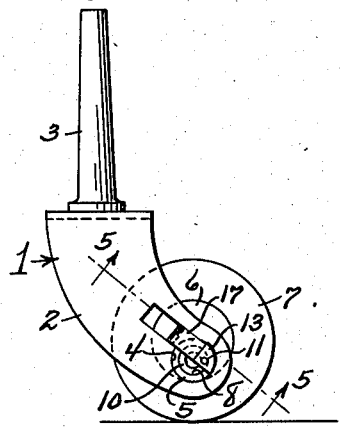
Figure 1 is a side elevation of the improved caster.
Figure 3:
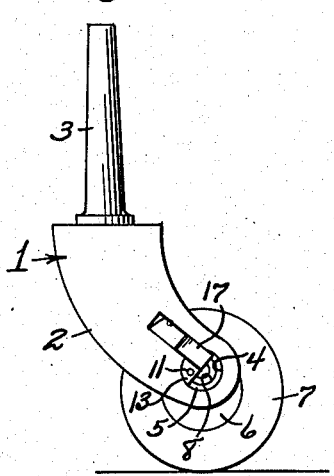
Figure 3 is a view similar to Figure 1 showing the axle turned to an adjusted position.
Figure 4:
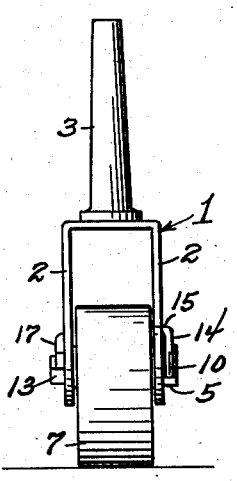
Figure 4 is a front view of the caster.

This improved caster is intended to be mounted at the lower end of a table leg or the like and has a frame 1 provided with side arms 2 and carrying an upstanding shank 3 to fit within the usual socket embedded in the table leg. Large openings 4 are formed through lower end portions of the arms 2 in alignment with each other to rotatably receive pintles 5 projecting from opposite sides of an axle 6 about which the roller 7 fits. The pintles 6 disposed eccentric to the axle in alignment with each other and through the axle is formed a bore 8 having its end portions passing through the pintles concentric thereto. Annular grooves 9 are formed within the roller to reduce frictional engagement between the roller and the axle and allow the roller to turn freely about the axle. Referring to Figures 1 and 3 it will be seen that by turning the axle in the openings 4 a cam action will be exerted upon the roller and the roller shifted vertically from the lowered position shown in Figure 1 to the raised position of Figure 3. Therefore, the vertical relation of the frame and the roller relative to each other may be adjusted and an article of furniture resting upon an uneven floor or having one leg resting upon a rug may be steadied without a wedge, such as folded paper, under the roller of the caster carried by one leg of the article of furniture. The adjustment of the roller may be very slight or for the full distance which turning the axle will shift the roller vertically.

Figure 2:
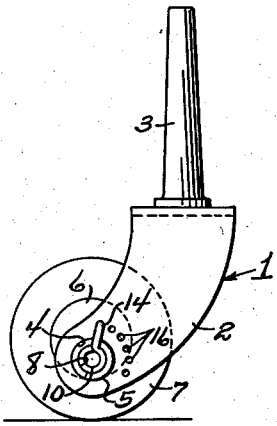
Figure 2 is a view looking at the other side of the caster.
Figure 5:
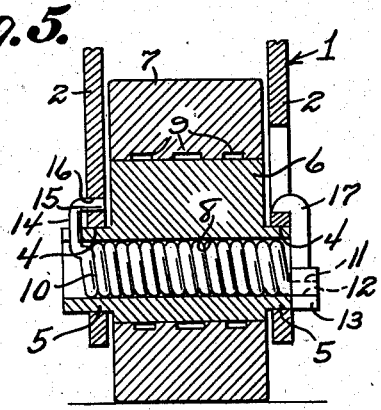
Figure 5 is a sectional view upon an enlarged scale taken along line 5—5 of Figure 1.
Figure 6:
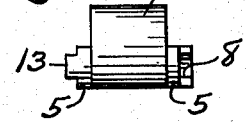
Figure 6 is a side view of the axle.

It is desired to normally hold the axle in the position shown in Figure 3 but allow it to turn towards the position of Figure 1 and then turn back towards the position of Figure 3. Therefore there has been provided a helical spring 10 formed from a strand of resilient wire. This spring fits snugly within the bore 8 and is of such length that its ends terminate in spaced relation to ends of the bore, as shown in Figure 5. One end of the spring is provided with an anchoring pin 11 formed by a bent end of the resilient strand, and this pin is engaged in an opening or socket 12 formed in a lug 13 projecting outwardly from the pintle at one end of the axle. The other end portion of the resilient strand is bent to form an arm 14 which extends radially from the spring and has its extremity bent to form a finger 15 for engaging in a selected one of a series of openings or seats 16 formed in the side arm of the frame. The openings or seats 16 extend in an arcuate path, as shown in Figure 2, and by engaging the finger 15 in a predetermined one of the seats tension of the spring may be regulated. A tongue 17 which is struck vertically from the arm of the frame and bent downwardly serves to limit rotation of the axle by abutting engagement of the lug 13 with the lower end portion of the tongue.

When casters of the improved construction are in use they are applied to the legs of a table in the usual manner by fitting their shanks 3 into sockets embedded in the table legs. The table is then moved across a floor to the desired position and if the rollers of all of the casters rest firmly against the floor no adjustments of the casters is necessary. If, however, it is found that the roller of a caster does not rest firmly upon the floor the table is pressed downwardly and short shifting movements imparted to it. During such shifting movements the axles will be turned with the rollers towards the position of Figure 1 and the springs wound. Movement of the table will be stopped with it in the desired position and pressure then relieved so that the springs may unwind and turn the axles towards the position of Figure 3 and during such movement the axles will exert cam action upon the rollers and shift them vertically until the rollers of all the casters rest firmly upon the floor or rug upon which they bear. The rollers will thus be automatically adjusted to cause all of them to bear firmly upon the surface upon which they rest and the table will be steadied and not have a tendency to tilt.

Having thus described the invention, what is claimed is:

1. A caster comprising a frame adapted to be mounted under an article to be supported and having spaced forks, a roller between said forks, an axle for said roller having aligned pintles at its opposite sides rotatably engaged through openings in the forks, said pintles being eccentric to the axle and a bore being formed through the axle concentric with the pintles, a lug carried by the pintle at one end of said axle, a stop carried by the fork through which the said pintle passes for engagement by said lug for limiting rotation of the axle, a helical spring in the bore of said axle having one end anchored to said lug, an arm at the other end of said spring extending radially therefrom, the adjacent fork being formed with a series of openings in an arcuate path, and the outer end portion of said arm being bent to form an inwardly extending finger engaged in a selected one of the openings to regulate tension of the spring.

2. A caster comprising a frame having spaced forks formed with aligned openings, a roller between said forks, an axle for said roller, aligned pintles at opposite sides of said axle eccentric thereto and rotatably mounted through the openings of said forks, said axle having a bore concentric with said spindles, a lug projecting from one pintle and formed with an opening, a tongue cut from the fork through which the said pintle passes and bent downwardly across the outer end of the pintle for engagement by the lug to limit turning of the axle, a spring in the bore having a pin at one end engaged in the opening of the lug, the other fork being formed with a series of seats spaced from each other transversely of the fork, and an arm extending from the spring an engaged in a selected seat to control tension of the spring.

3. A caster comprising a frame having spaced forks, a roller between said forks, an axle for said roller having aligned pintles at its sides eccentric to the axle and rotatably mounted through said forks, a lug carried by one pintle for engaging the adjacent fork and limiting turning of the axle, the other fork having a transverse row of seats, a spring for imparting rotation to the axle in one direction mounted through said axle and having one end anchored thereto and an arm at the other end of said spring and engaged in a selected seat to regulate tension of the spring.

4. A caster comprising a frame having spaced forks, a roller between said forks, an axle for said roller having aligned pintles at its sides eccentric to the axle and rotatably mounted through said forks, a lug carried by one pintle for engaging the adjacent fork and limiting turning of the axle, the other fork having a transverse row of seats, said axle having a bore concentric to the pintles, and a spring in said bore anchored at one end to the axle and having an arm at its other end engaged in a selected seat to regulate tension of the spring.

5. A caster comprising a frame having spaced forks, a roller between said forks, an axle for said roller having aligned pintles at its sides eccentric to the axle and rotatably mounted through said forks, a lug carried by one pintle for engaging the adjacent fork and limiting turning of the axle, the other fork having a transverse row of seats, and a spring for imparting rotation to the axle in one direction carried by and anchored to said axle and having an arm at one end engaged in a selected seat to regulate tension of the spring.

CLYDE N. RAUP.